United States Patent [19]
Smith

[11] Patent Number: 5,691,577
[45] Date of Patent: Nov. 25, 1997

[54] REFLECTOR-PUMP NETWORK FOR PREEMPTING AC POWER SUPPLY HARMONIC DISTORTION AND FOR SATIATING THE COMPLEX HARMONIC POWER DEMAND OF A RECTIFIER

[76] Inventor: Steve Smith, 5100 Channel Ave., Richmond, Calif. 94804

[21] Appl. No.: 642,414

[22] Filed: May 3, 1996

[51] Int. Cl.$^6$ ............................................. H02M 1/12
[52] U.S. Cl. ............................................. 307/105; 363/44
[58] Field of Search ..................... 307/105; 333/167, 333/168, 172, 175, 176; 363/39, 44, 45, 47, 48; 323/206, 208

[56] References Cited
U.S. PATENT DOCUMENTS

| | | | |
|---|---|---|---|
| 4,639,847 | 1/1987 | Brakus | 363/48 |
| 5,113,335 | 5/1992 | Smith | 363/44 |
| 5,251,120 | 10/1993 | Smith | 363/44 |
| 5,311,419 | 5/1994 | Shires | 363/65 |
| 5,387,821 | 2/1995 | Steciuk et al. | 307/105 |
| 5,491,624 | 2/1996 | Levran et al. | 363/44 |

Primary Examiner—Richard T. Elms
Attorney, Agent, or Firm—Thomas E. Schatzel; Law Offices of Thomas E. Schatzel A Prof. Corporation

[57] ABSTRACT

A reflector-pump network is provided for insertion between an AC power supply source and a full-wave rectifier in an AC-DC power converter. The complex harmonic current demands generated by the full-wave rectification process are satiated by a pump in the network. Such complex harmonic current demands are further isolated from the AC power source by the reflectors in the network.

12 Claims, 2 Drawing Sheets

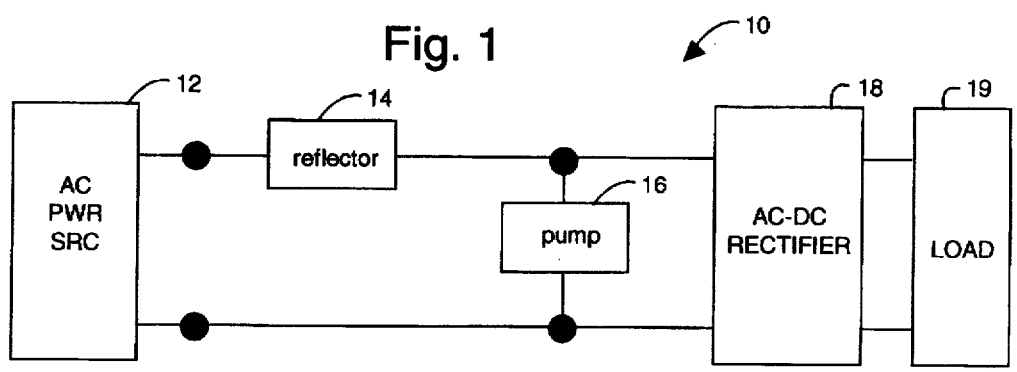
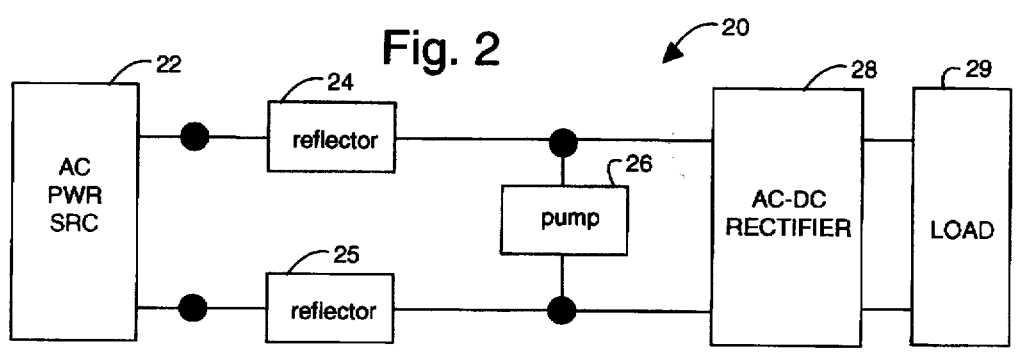
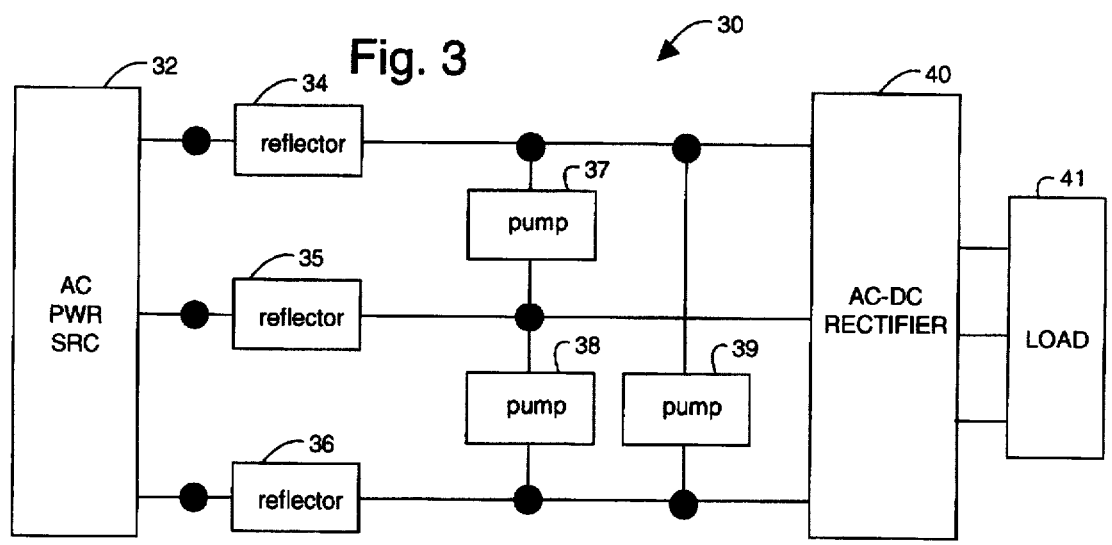

REFLECTOR-PUMP NETWORK FOR PREEMPTING AC POWER SUPPLY HARMONIC DISTORTION AND FOR SATIATING THE COMPLEX HARMONIC POWER DEMAND OF A RECTIFIER

BACKGROUND OF THE INVENTION

1. Field of the Invention

The present invention relates to power distribution circuitry and more specifically to systems and devices to protect an alternating current (AC) power line source from excessive harmonic electrical noise generated by each direct current (DC) power load distributed on the network.

2. Description of the Prior Art

The traditional emphasis in power supply design has been to produce a clean DC output for the DC load and to totally ignore the noise that was being generated back in the AC power source. This was acceptable when the AC power source was of fifty or sixty Hertz coming from the local power utility over subtransmission and distribution lines and transformers. These acted to isolate the far-flung distributed loads from one another. But the situation is very different on airplanes and other vessels that use four hundred Hertz AC power distribution systems to power various instrument and functional sub-systems aboard the craft.

Power supplies for deriving DC power from an AC power supply are well known and used to power loads ranging from lighting to personal computers. Such power supplies typically include a rectifier that does the basic AC to DC conversion, and a large storage capacitor at the output that smoothes the pulsing DC and then supplies a smoother DC power. The AC current input to these circuits tends to be in short pulses which have sharp peaks and are of short duration when compared to the substantially sinusoidal voltage waveform of the input AC power supply. Unfortunately, the pulsing input current is rich in odd harmonics and results in a poor power factor at the input of the power supply.

The prior art has produced a large variety of arrangements to overcome the problems associated with the pulsing input currents. Many include active circuits, e.g., transistorized control circuitry either in a discrete or integrated form. Such circuits typically monitor the input current and use various control schemes, e.g., pulse width modulation (PWM), to shape the input current to substantially match the input voltage and thereby produce a nearly 100% power factor or harmonic free load to the AC power supply.

Conventional active control arrangements are often sensitive to line transients, and accordingly, measures must be taken to protect the active circuitry. Also, to be able to use reasonably sized power components, high frequency operation is often resorted to. This can generate radiated and conducted noise and produce line isolation problems. The correction of such noise and line isolation problems requires more circuitry, and that adds to the complexity and costs of such arrangements.

Prior art passive arrangements also exist, but are not usually capable of delivering substantially 100% power factor. However, passive arrangements can and do provide measurable improvements in the power factor and harmonic noise feedback from the load. Most passive arrangements seem to depend on the linear behavior of inductive components. But to achieve both the linearity and the inductance needed for high power applications at low AC supply frequencies, the required inductors are typically very physically large. Such size and weight makes prior art passive solutions undesirable for many applications which require compact packaging or some amount of portability.

Prior art passive arrangements include resonant circuit operation wherein an inductor and a capacitor are selected to resonate at preselected frequencies that are multiples of the AC power supply frequency. The inductor is connected in series or parallel with the AC power supply and load, and is modeled in terms of linear circuit elements and phasor analysis in view of its linear operation and sinusoidal nature of operation.

According to U.S. Pat. No. 5,416,687, issued May 16, 1995, to Beasley, the principal limitations of resonant linear arrangements are poor control of the corrected wave shape due to the nature of large steel inductors and an associated low Q factor of the tuned network and, the large size of the inductors due to the need of linear inductors to pass large currents and still maintain linear operation and low $I^2 R$ losses.

Another type of passive operation, according to Beasley, is bandpass limiting. "As is well known in the art, any wave shape other than a pure sinusoid is made up of other harmonics of different phases and magnitudes." The pulsing current wave created by rectification and filtering of the AC input supply is a complex wave. A bandpass limiting arrangement controls the bandpass of power from the AC power supply to block out the higher order harmonics, and thereby prevent the distortion effects of the line current. The principal limitations of bandpass limiting are the large linear inductors required and the large reduction in the effective DC output voltage that occurs. Several stages of filters may also be required to accomplish the desired bandpass limiting.

Conventional aircraft power supplies distribute 400 Hz power that can sometimes become corrupted with frequencies other than the fundamental 400 Hz frequency. For example, in the case of aircraft and other generating sources where the desired input frequency is 400 Hz, it is not uncommon to find odd and even harmonics such as 800 Hz, 1200 Hz, 1600 Hz, 2000 Hz, up to about 3600 Hz. Variations such as 820 Hz, 1220 Hz, etc. can also appear. When such spurious frequencies are present at the 400 Hz input of an AC/DC power converter, amounts as small as three to four percent can produce beat frequencies that can induce "flicker" in the aircraft's cabin fluorescent lamps. Other, more serious effects can be observed in on-board instrument and auxiliary systems. Such beat frequencies can also radiate as electro-magnetic interference (EMI) from the power control system and cause malfunctions of radio and navigation systems.

The Boeing Aircraft Company has therefore promulgated their Specification D644588W, that states in part, "When energized by a normal AC voltage free of harmonics, load equipment shall not demand odd harmonics of current in excess of thirty percent of the rated fundamental component divided by the order of harmonics or three amperes divided by the order of the harmonic, whichever is smaller." Also, "Load equipment shall not demand odd triplets (3, 9, 15, 21, etc.) harmonic current in excess of ten percent of the rated fundamental component divided by the order of harmonics or one ampere divided by the order of the harmonic, whichever is smaller."

Toward such ends, U.S. Pat. No. 5,491,624, issued Feb. 13, 1996, to Levran, et. al., describes a power conversion system for converting alternating current (AC) to direct current (DC). One embodiment of the invention "places an impedance between the incoming AC power and a series of switching elements which are selectively enabled to convert the incoming AC power to a DC output." The system can be used for any number of different phases of incoming AC power and operated in a fixed frequency mode or hysteresis mode. Feedback is needed for most of the applications envisioned, including pure demand based on the DC output voltage, and demand as modified to accommodate the instantaneous phase of the incoming AC power. The advantages of the circuit include low harmonic distortion in the AC source by switching at a relatively high frequency compared to the power supply frequency. The size and weight of the circuitry is supposedly reduced by eliminating the large transformers which would otherwise be required to accommodate the power supplied at the DC output.

U.S. Pat. No. 5,311,419, issued May 10, 1994, to Edwin J. Shires, identifies the need to convert polyphase AC power into DC power for one or more loads in an aircraft. Polyphase 400 Hz AC power supplied by a ground power cart is converted into DC power for on-board loads while the aircraft is on the ground. Such AC/DC power conversion depends on multiple rectifiers connected together in a bridge configuration. However, the currents drawn are non-sinusoidal and can contain high levels of low order harmonics. Such harmonic currents can cause unacceptably severe voltage waveform distortion in the AC source.

In the prior art, ordinary AC input harmonic filters have been used to reduce the harmonic currents on the input side of the converter. Also rectifier topologies of multiple bridge rectifiers and isolation transformers have been tried, owing to the need to isolate the input of the converter from the output for safety reasons. But the added components have significantly increased the size and weight of the overall converter, and thus limited the usefulness of such approaches in applications where size and weight must be kept to a minimum, such as in aircraft.

Another conventional approach includes rectifying the polyphase AC power using controllable switching devices instead of uncontrolled diodes. A phase controlled rectifier bridge is one example of a converter that adopts this approach. But a rectifier bridge of naturally commutated controlled thyristors can ruin the input power factor to the AC source, and thereby require that a larger AC input source be used. An example of an AC/DC converter that uses controllable switching devices is described by Brewster, et al., in U.S. Pat. No. 4,143,414. Three separate single-phase AC/DC converters are used to receive phase-to-phase voltages developed by a three-phase voltage source. Each AC/DC converter includes a first full-wave rectifier that converts the phase-to-phase AC voltage into a DC voltage and an H-bridge converter coupled to the first full-wave rectifier. The H-bridge converter includes first and second pairs of thyristors that are alternately operated and that are coupled to a primary winding of an isolation transformer. A secondary winding of the isolation transformer is coupled to a second full-wave rectifier bridge. The second full-wave rectifier bridges of the AC/DC converters are connected together in parallel to form an output of the overall converter. One disadvantage with the converter shown in the Brewster et al. patent is that the thyristors are not self-commutating and therefore require a resonant commutation circuit for proper operation. This resonant commutation circuit increases the size and weight of the overall converter, and the independent operation of the three converters does not guarantee matching of the supply currents to each. Therefore the triple harmonics may not cancel completely.

Shires purports to describe an AC/DC power converter that provides the complete cancellation of controlled harmonics, and the control of the input power factor and output voltage in a simple and effective fashion. Shires describes a power converter for transforming an input AC power of N number of phase-to-phase input AC waveforms at a first frequency into overall output DC power. N is an integer greater than two. N number of phase-to-phase AC/DC converters each receive a phase-to-phase waveform and have outputs connected in series. Each AC/DC converter rectifies the phase-to-phase waveform to obtain an intermediate DC power. A converter is connected to the rectifier for converting the intermediate DC power into an intermediate AC power at a second frequency greater than the first frequency. A second rectifier is connected to the intermediate AC power to obtain converter output DC power. The converter output DC powers are combined to develop the overall output DC power and the N phase-to-phase AC/DC converters are controlled to manage the AC input power factor and harmonics.

In two previous patents, the present inventor, Steve Smith, has described networks to isolate harmonic current in DC loads from their AC power sources. See, U.S. Pat. Nos. 5,251,120, issued Oct. 5, 1993, and 5,113,335, issued May 12, 1992. The '335 Patent, for example, diagrams a three-phase network comprised of parallel inductor-capacitor combinations in series with each leg of the DC bridge rectifier connection to the AC input power source, and a series inductor-capacitor combination connected in shunt across each input of the bridge rectifier. The network uses, in combination, at least one "resonator", which is connected across the input of a DC power supply, and at least one "reflector", which is connected to couple the input of the DC power supply to an AC power line. Each resonator, includes the series combination of an inductor and a capacitor. At least some of the reflectors include the parallel combination of an inductor and a capacitor. In FIG. 2 of the '120 Patent, the sole resonator includes inductor 170 and capacitor 172. One of the two reflectors includes inductor 150 and capacitor 152. The resonators provide the harmonic currents which the DC power supply requires for proper operation. The reflectors reflect the harmonic energy back toward the power supply. In order to attenuate the level of higher order harmonic currents, in some embodiments, a reflector is employed which includes, at least, an inductor and a resistor. Again in FIG. 2, such a reflector includes inductor 140 and resistor 144. The number of resonators and the number of reflectors vary with the application. In many applications, only one resonator and one reflector are required. However, all applications require at least one of each.

As the operation of these circuits has become better understood, resonators are now referred to as pumps, because the interaction with the rectifier diodes pumps up the energy level in the pump and this energy transfers through the rectifier to the load. The reflectors function to reflect such energy through the rectifiers to the load.

SUMMARY OF THE PRESENT INVENTION

It is therefore an object of the present invention to provide an improved harmonic noise elimination network.

It is another object of the present invention to provide a network capable of meeting stringent industry requirements.

Briefly, an embodiment of the present invention comprises a reflector-pump network that is provided for insertion between an AC power supply source and a full-wave rectifier in an AC-DC power converter. The complex harmonic current demands generated by the full-wave rectification process are satiated by a pump in the network. Such complex harmonic current demands are further isolated from the AC power source by the reflectors in the network.

A principle advantage of the present invention is that an improved harmonic noise elimination network is provided that dramatically reduces the higher harmonic levels over the prior art, even for harmonics above the highest harmonic for which the pump or any reflector is tuned. Preferential attenuation of odd triplets of harmonics is afforded, again even for harmonics above the highest harmonic for which the pump or any reflector is tuned.

An advantage of the present invention is that an improved harmonic noise elimination network is provided that reduces a broad spectrum of harmonics while avoiding the use of circuit elements tuned to each of a multiplicity of harmonics.

A further advantage of the present invention is that an improved harmonic noise elimination network is provided that eliminates the use of circuit elements tuned to higher harmonics, and thus improves the manufacturability and stability of the embodiments.

Another advantage of the present invention is that a network is provided that meets or exceeds the most difficult of industry standards for the control of harmonic noise.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a block diagram of a reflector-pump network in a first embodiment of the present invention that provides for the prevention of odd harmonic current demands from a single-phase AC power supply;

FIG. 2 is a block diagram of a reflector-pump network in a second embodiment of the present invention that provides for the prevention of odd harmonic current demands from a single-phase AC power supply;

FIG. 3 is a block diagram of a reflector-pump network in a third embodiment of the present invention that provides for the prevention of odd harmonic current demands from a three-phase AC power supply;

DETAILED DESCRIPTION OF THE PREFERRED EMBODIMENTS

Figure 4A:
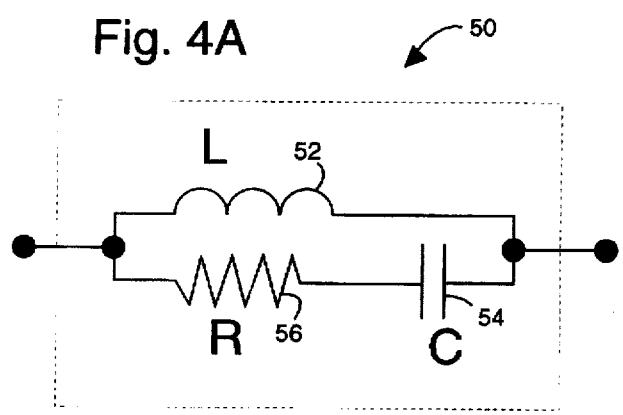
FIGS. 4A and 4B are schematic diagrams of a typical reflector circuit and a cascaded reflector circuit useful in the networks of FIGS. 1–3.

FIG. 1 illustrates a reflector-pump network embodiment of the present invention, referred to by the general reference numeral 10. The network 10 provides for a two-terminal connection to a single-phase AC power source 12, which is a fixed-frequency source typically operating at 400 Hz in an aircraft power supply configuration. A two-terminal reflector 14 is connected in series with one leg and a two-terminal pump 16 is connected in shunt with an AC-DC rectifier 18. For example, the AC-DC rectifier 18 comprises a full-wave silicon diode rectifier bridge of an AC-DC power converter that ultimately supplies DC power to a load 19. The AC-DC rectifier 18 is typical in that it produces a complex harmonic current demand from the AC power source 12.

The two-terminal reflector 14 provides a complex response to currents passing through that depends on the constituent frequencies involved. In general, the two-terminal reflector 14 presents a high impedance to the complex harmonic current demand produced by the AC-DC rectifier 18. Conceptually, any such complex harmonic currents are reflected back to the AC-DC rectifier 18 and prevented from circulating through to the AC power source 12.

The two-terminal pump 16 provides a complex response to the voltages appearing across it that depends on the constituent frequencies involved. In general, the two-terminal pump 16 acts as a current generator that satiates the complex harmonic current demand produced by the AC-DC rectifier 18. Conceptually, most of the complex harmonic current demands made by the AC-DC rectifier 18 are fulfilled by stored energy held in the pump 16 and thereby prevented from appearing to the AC power source 12. It appears that efficient energy transfer from the source through the rectifiers to the load is obtained with the pump tuned to just above the fifth harmonic, e.g., 5.3–5.5 times the line frequency.

FIG. 2 illustrates a reflector-pump network embodiment of the present invention, referred to by the general reference numeral 20. The network 20 provides for a two-terminal connection to a single-phase AC power source 22, which is a fixed-frequency source typically operating at 400 Hz in an aircraft power supply configuration. A first two-terminal reflector 24 is connected in series with one leg, a second two-terminal reflector 25 is connected in series with the other leg, and a two-terminal pump 26 is connected in shunt with an AC-DC rectifier 28. For example, the AC-DC rectifier 28 comprises a full-wave silicon diode rectifier bridge of an AC-DC power converter that ultimately supplies DC power to a load 29. The AC-DC rectifier 28 is typical in that it requires a complex harmonic current demand from the AC power source 22.

The two-terminal reflectors 24 and 25 provide a complex response to currents passing through that depends on the constituent frequencies involved. In general, the two-terminal reflectors 24 and 25 present a high impedance to the complex harmonic current demand produced by the AC-DC rectifier 28. Conceptually, any such complex harmonic currents are reflected back to the AC-DC rectifier 28 and are prevented from appearing to the AC power source 22.

The two-terminal pump 26 provides a complex response to the voltages appearing across it that depends on the constituent frequencies involved. In general, the two-terminal pump 26 acts as a current generator that satiates the complex harmonic current demand produced by the AC-DC rectifier 28. Conceptually, most of the complex harmonic current demands made by the AC-DC rectifier 28 are fulfilled by stored energy held in the pump 26 and are thereby prevented from appearing to the AC power source 22.

FIG. 3 illustrates a reflector-pump network embodiment of the present invention, referred to by the general reference numeral 30. The network 30 provides for a three-terminal connection to a three-phase AC power source 32, which is a fixed-frequency source typically operating at 400 Hz in an aircraft power supply configuration. A first two-terminal reflector 34 is connected in series with a first leg, a second two-terminal reflector 35 is connected in series with a second leg, and a third two-terminal reflector 36 is connected in series with a third leg. A set of three two-terminal pumps 37–39 are respectively connected in shunt with each pair of connectors to an AC-DC rectifier 40. For example, the AC-DC rectifier 40 comprises a full-wave rectifier bridge of an AC-DC power converter that ultimately supplies DC power to a load 41. The AC-DC rectifier 40 is typical in that it produces a complex harmonic current demand from the AC power source 32.

FIG. 3 represents a delta-type three-phase configuration. Alternatively, the present invention includes wye-type three-phase configurations.

The two-terminal reflectors 34–36 each provide a complex response to currents passing through that depends on the constituent frequencies involved. In general, the two-terminal reflectors 34–36 present a high impedance to the complex harmonic current demand produced by the AC-DC rectifier 40. Conceptually, any such complex harmonic currents are reflected back to the AC-DC rectifier 40 and prevented from appearing to the AC power source 32.

The two-terminal pumps 37–39 provide a complex response to the voltages appearing across each that depends on the constituent frequencies involved. In general, the two-terminal pumps 37–39 act as current generators that each satiate a part of the complex harmonic current demand produced by the AC-DC rectifier 40. Conceptually, most of the complex harmonic current demands made by the AC-DC rectifier 40 are fulfilled by stored energy held in the pumps 37–39 and are thereby prevented from appearing to the AC power source 32.

Each of the reflectors 14, 24, 25, and 34–36 and the pumps 16, 26, and 37–39 receive energy from the associated AC power source 12, 22, or 32, e.g., at 400 Hz, and release some of it back with magnitudes that are frequency dependent. For example, an inductor-capacitor combination with a resonant frequency of 1200 Hz can be excited with a 400 Hz input only to then ring back out with a 1200 Hz output. The releases of energy back by the reflectors 14, 24, 25, and 34–36 and the pumps 16, 26, and 37–39 are preferably tuned in harmonic content and magnitude to satiate the complex harmonic current demands of the AC-DC rectifiers 18, 28 and 40 and to prevent the appearance of such spurious noise to the AC power sources 12, 22, and 32.

FIG. 4A illustrates a first embodiment of a reflector 50 that could be used for any of reflectors 14, 24, 25, and 34–36. An inductor 52 is connected in shunt with a series combination of a capacitor 54 and a resistor 56. In one embodiment, the inductor 52 was 0.010 henries, the resistor 56 was twenty-seven ohms, and the capacitor 54 was 0.1 microfarads.

Figure 4B:
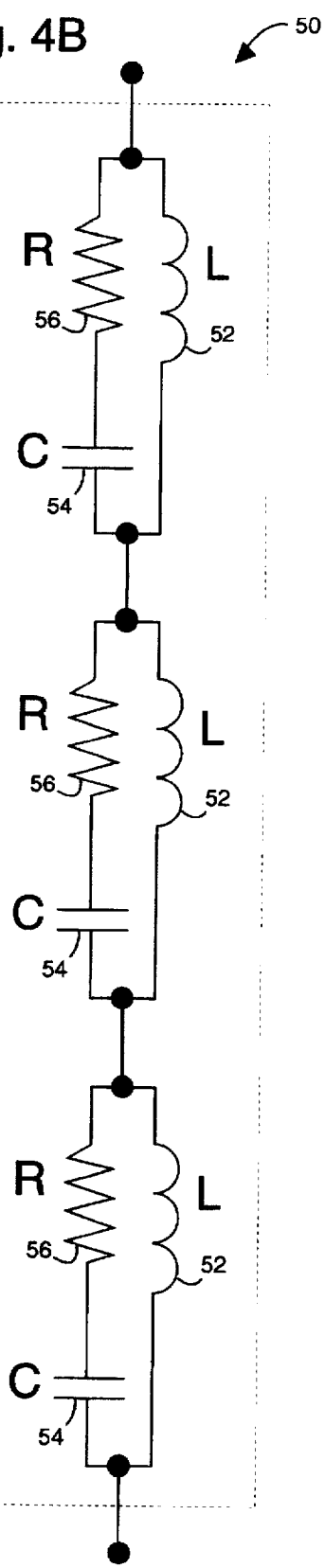

The reflector 50 may alternatively comprise several L-R-C combinations, as exemplified by FIG. 4B, in series-connected stages, e.g., in cascade. For example, the three stages in an actual prototype that provided good results comprised the following component values listed in Table I.

TABLE I

|  | L 52 | R 56 | C 54 |
|---|---|---|---|
| Stage 1 | 0.01 H | 27Ω | 1.0 μF |
| Stage 2 | 0.01 H | 0Ω | 0.3 μF |
| Stage 3 | 0.004 H | 0Ω | 4.4 μF |

Figure 5:
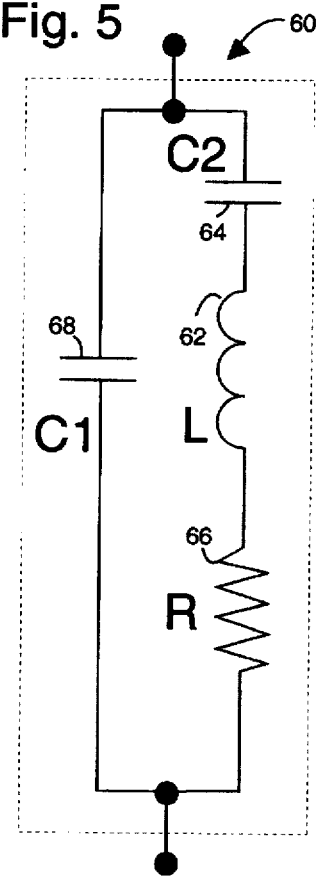
FIG. 5 is a schematic diagram of a typical pump circuit useful in the networks of FIGS. 1–3.

FIG. 5 illustrates a first embodiment of a pump 60 that could be used for any of pumps 16, 26, and 37–39. An inductor 62 is connected in series with a capacitor 64 and a resistor 66. A capacitor 68 shunts the whole combination. In one embodiment, the inductor 62 was 0.0114 henries, the resistor 66 was twenty-seven ohms, the capacitor 64 was 0.44 microfarads, and the capacitor 66 was 0.01 microfarads.

The situation in the illustrations of U.S. Pat. No. 5,113,335, issued May 12, 1992, to the present inventor, Steve Smith, looks very similar. Such Patent is incorporated herein by reference. However, there is no resistor in series with inductor 70 (FIG. 1 of '335) and capacitor 72, nor is there a capacitor shunting the series combination of inductor 70 and capacitor 72.

The present inventor has conducted various experiments that produced surprising results related to the ability of the pump 60 to satiate the complex harmonic current demands of the downstream rectifiers. The results were surprising because the data showed that the currents through pump 60 are not discontinuous, so a theoretically assumed L-C-R damping action attributed to the resistor 66 is not involved. It was empirically discovered that there is an optimum value for the resistor 66, e.g., approximately twenty-percent of the load impedance when the circuit-Q of the pump 60 is about one. In particular, it was observed that the energies of odd triplet harmonics are disproportionately reduced by optimal values of the resistor 66. Experiments using a value of twenty-seven ohms for resistor 66 resulted in an average seventy-two percent reduction in harmonic amplitudes, and eighty-one percent reduction in odd triplet harmonics, e.g., the third, sixth, ninth, etc. In general, the resistance of resistor 66 should significantly exceed the sum of the incidental winding resistance of the inductor 62 and any intentionally incorporated series resistance.

Even so, the addition of resistor 66 alone in tests conducted was not enough to satisfy the demands of the Boeing Specification mentioned herein. It was hypothesized that if a broad spectrum source of the troublesome harmonics being demanded by the rectification process were made available at the rectifier input, then such harmonics might not circulate in the power line. What was surprising was that the improvement was preferential for the odd triplets, both with and without the resistor 66. Therefore, the capacitor 68 is required.

There is a preferred range for the capacitor 68, too small does nothing and too large a value, one comparable to the value of capacitor 64, will upset the basic functioning of the pump 60. Therefore, $0 < C_{68} < C_{64}$. In one test circuit where capacitor 64 was 0.44 microfarads, the capacitor 68 was chosen to be 0.10 microfarads.

Whatever the particular combination of reflectors 50 and pumps 60 used, e.g., FIGS. 1–3, the series combination of all the reflectors should preferably present at least an additional ten percent of the load impedance to the AC power supply at the fundamental frequency. The pump will not operate properly if it is effectively shorted by an AC main energy source with a very low impedance.

Particular notice should be taken in the fact that the embodiments of the present invention do not depend on the use of circuit elements tuned to any or all of the higher order harmonic frequencies that are required to be suppressed. Instead, the particular harmonic current demands of the rectification process are satiated by the pumps and isolated from the AC power supply by the reflectors.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A reflector-pump network, comprising:

a pair of input terminals providing for a connection to a source of fixed-frequency single-phase alternating current power;

a pair of output terminals providing for the connection to a rectifier that generates a complex harmonic current demand comprising at least odd triplet harmonics of a fundamental frequency of said fixed-frequency single-phase alternating current power;

at least one reflector connected between the input and output terminals and providing for the isolation of said complex harmonic current demand from the input terminals; and at least one pump connected across the output terminals and providing a satiating power source for said complex harmonic current demand;

wherein, the at least one reflector presents at least an additional ten percent of the load impedance to said AC power supply at the fundamental frequency, and;

wherein, the at least one pump and the at least one reflector cooperate in isolating signals between the input and output terminals at the frequencies included in said at least odd triplet harmonics.

2. The network of claim 1, wherein:

the at least one reflector comprises an inductor connected in parallel with a series-connected capacitor and resistor, wherein the at least one reflector has critical values dependent on the frequencies of said at least odd triplet harmonics.

3. The network of claim 1, wherein:

the at least one reflector comprises a cascaded series wherein at least one stage in said series is an inductor connected in parallel with a series-connected capacitor and resistor, wherein the at least one reflector has critical values dependent on the frequencies of said at least odd triplet harmonics.

4. The network of claim 1, wherein:

the at least one pump comprises a first capacitor in shunt with an inductor connected in series with a second capacitor and a resistor, wherein the at least one pump has critical values dependent on the frequencies of said at least odd triplet harmonics; and said first capacitor is exceeded in capacitance by said second capacitor.

5. An improved reflector-pump network having a pair of input terminals providing for a connection to a source of fixed-frequency single-phase alternating current power, and a pair of output terminals providing for the connection to a rectifier that generates a complex harmonic current demand, the improvement comprising:

at least one reflector connected between the input and output terminals and providing for the isolation of said complex harmonic current demand from the input terminals, wherein the at least one reflector comprises an inductor connected in parallel with a series-connected capacitor and resistor, and wherein, the at least one reflector presents at least an additional ten percent of the load impedance to said AC power supply at the fundamental frequency of said fixed-frequency single-phase alternating current power; and at least one pump connected across the output terminals and providing a satiating power source for said complex harmonic current demand, wherein the at least one pump comprises a first capacitor in shunt with an inductor connected in series with a second capacitor and a resistor, and said first capacitor is exceeded in capacitance by said second capacitor;

wherein the harmonic current demands of said rectifier are satiated by the at least one pump and blocked by the at least one reflector over a wide frequency spectrum that includes odd triplet harmonics.

6. The network of claim 5, wherein:

the at least one reflector comprises a cascaded series wherein at least one stage in said series is an inductor connected in parallel with a series-connected capacitor and resistor, wherein the at least one reflector has critical values dependent on the frequencies of said at least odd triplet harmonics.

7. A reflector-pump network, comprising:

a set of three input terminals providing for a connection to a source of fixed-frequency three-phase alternating current power;

a set of three output terminals providing for the connection to a rectifier that generates a complex harmonic current demand that includes odd triplet harmonics;

at least one reflector connected between each corresponding pair of input and output terminals and providing for the isolation of said complex harmonic current demand from the input terminals; and at least one pump connected across each pair of the output terminals and providing a satiating power source for said complex harmonic current demand.

8. The network of claim 7, wherein:

the at least one reflector comprises an inductor connected in parallel with a series-connected capacitor and resistor, wherein the at least one reflector has critical values dependent on the frequencies of said at least odd triplet harmonics.

9. The network of claim 7, wherein:

the at least one reflector comprises a cascaded series wherein at least one stage in said series is an inductor connected in parallel with a series-connected capacitor and resistor, wherein the at least one reflector has critical values dependent on the frequencies of said at least odd triplet harmonics.

10. The network of claim 7, wherein:

the at least one pump comprises a capacitor in shunt with an inductor connected in series with a capacitor, wherein the at least one pump has critical values dependent on the frequencies of said at least odd triplet harmonics.

11. An improved reflector-pump network having a set of three input terminals providing for a connection to a source of fixed-frequency three-phase alternating current power, and a set of three output terminals providing for a delta or wye connection to a full-wave rectifier that generates a complex harmonic current demand that includes odd triplet harmonics, the improvement comprising:

at least one reflector connected between each corresponding input and output terminal and providing for the isolation of said complex harmonic current demand from the input terminals, wherein the at least one reflector comprises an inductor connected in parallel with a series-connected capacitor and resistor, and wherein, the at least one reflector presents at least an additional ten percent of the load impedance to said AC power supply at the fundamental frequency of said fixed-frequency three-phase alternating current power; and a pump connected between each pair of the output terminals and providing a satiating power source for said complex harmonic current demand, wherein the pump comprise a first capacitor in shunt with an inductor connected in series with a second capacitor and a resistor, and said first capacitor is exceeded in capacitance by said second capacitor;

wherein the harmonic current demands of said rectifier are satiated by the pump and blocked by the at least one reflector over a wide frequency spectrum that includes higher order harmonics.

12. The network of claim 11, wherein:

the at least one reflector comprises a cascaded series wherein at least one stage in said series is an inductor connected in parallel with a series-connected capacitor and resistor, wherein the at least one reflector has critical values dependent on the frequencies of said at least odd triplet harmonics.

* * * * *